United States Patent [19]

Atmur et al.

[11] Patent Number: 5,687,787
[45] Date of Patent: *Nov. 18, 1997

[54] FIBER REINFORCED CERAMIC MATRIX COMPOSITE INTERNAL COMBUSTION ENGINE EXHAUST MANIFOLD

[75] Inventors: Steven Donald Atmur, Riverside; Thomas Edward Strasser, Corona, both of Calif.

[73] Assignee: Northrop Grumman Corporation, Los Angeles, Calif.

[*] Notice: The term of this patent shall not extend beyond the expiration date of Pat. No. 5,632,320.

[21] Appl. No.: 515,925

[22] Filed: Aug. 16, 1995

[51] Int. Cl.⁶ .................. B22D 19/08; C04B 35/80; B05D 1/36; F01N 7/10
[52] U.S. Cl. .................. 164/98; 60/323; 264/60; 427/266
[58] Field of Search ............. 164/97, 98; 428/312.4, 428/312.6, 307.7, 313.9; 264/60; 427/266, 299, 407.1, 385.1; 60/282, 302, 323

[56] References Cited

U.S. PATENT DOCUMENTS

| | | | |
|---|---|---|---|
| 3,714,971 | 2/1973 | Venable, Jr. | 264/60 |
| 3,749,591 | 7/1973 | Hider et al. | 427/226 |
| 3,880,969 | 4/1975 | Latos . | |
| 3,956,531 | 5/1976 | Church et al. | 427/226 |
| 4,067,829 | 1/1978 | Garrett . | |
| 4,206,598 | 6/1980 | Rao et al. . | |
| 4,207,660 | 6/1980 | Rao et al. . | |
| 4,210,617 | 7/1980 | Bowman | 264/60 |
| 4,233,361 | 11/1980 | Fultz . | |
| 4,245,611 | 1/1981 | Mitchell et al. . | |
| 4,294,788 | 10/1981 | Laskow et al. . | |
| 4,311,541 | 1/1982 | Fultz . | |
| 4,341,826 | 7/1982 | Prewo et al. . | |
| 4,511,612 | 4/1985 | Huther et al. | 264/60 |
| 4,606,434 | 8/1986 | Vasilow et al. . | |
| 4,657,951 | 4/1987 | Takarada et al. . | |
| 4,818,732 | 4/1989 | Fox et al. . | |
| 4,884,400 | 12/1989 | Tanaka et al. . | |
| 4,887,518 | 12/1989 | Hayakawa . | |
| 4,928,645 | 5/1990 | Berneburg et al. . | |
| 4,972,674 | 11/1990 | Yamada et al. . | |
| 4,981,820 | 1/1991 | Renlund et al. . | |
| 5,000,136 | 3/1991 | Hansen et al. . | |
| 5,018,661 | 5/1991 | Cyb . | |
| 5,063,881 | 11/1991 | Kawamura . | |
| 5,066,626 | 11/1991 | Fukao et al. | 501/128 |
| 5,094,200 | 3/1992 | Fontichiaro . | |
| 5,114,262 | 5/1992 | Kojima . | |
| 5,126,087 | 6/1992 | Lespade et al. . | |
| 5,137,789 | 8/1992 | Kaushal . | |
| 5,139,717 | 8/1992 | Peuckert et al. | 264/60 |
| 5,139,979 | 8/1992 | Anderson et al. | 501/134 |
| 5,140,813 | 8/1992 | Whittenberger . | |
| 5,180,694 | 1/1993 | Renlund et al. . | |
| 5,203,228 | 4/1993 | Miyawaki et al. . | |
| 5,223,064 | 6/1993 | Gadkaree | 264/60 |
| 5,224,335 | 7/1993 | Yoshizaki . | |
| 5,224,572 | 7/1993 | Smolen, Jr. et al. . | |
| 5,225,283 | 7/1993 | Leung et al. . | |
| 5,230,924 | 7/1993 | Li | 427/226 |
| 5,231,059 | 7/1993 | Leung et al. . | |
| 5,244,720 | 9/1993 | Leung et al. . | |
| 5,258,084 | 11/1993 | Leung et al. . | |
| 5,352,529 | 10/1994 | Scanlon et al. | 428/428 |
| 5,382,453 | 1/1995 | Mason | 427/226 |
| 5,404,721 | 4/1995 | Hartsock . | |

*Primary Examiner*—Kuang Y. Lin
*Attorney, Agent, or Firm*—Terry J. Anderson; Karl J. Hoch, Jr.

[57] ABSTRACT

An exhaust manifold for an engine is made of all fiber reinforced ceramic matrix composite material so as to be light weight and high temperature resistant. A method of making the exhaust manifold comprises the steps of forming a liner of a cast monolithic ceramic material containing pores, filling the pores of the cast monolithic ceramic material with a pre-ceramic polymer resin, coating reinforcing fibers with an interface material to prevent a pre-ceramic polymer resin from adhering strongly to the reinforcing fibers, forming a mixture of a pre-ceramic polymer resin and reinforcing fibers coated with the interface material, forming an exhaust manifold shaped structure from the mixture of the pre-ceramic polymer resin and the reinforcing fibers coated with the interface material by placing the mixture on at least a portion of the cast monolithic ceramic material, and firing the exhaust component shaped structure at a temperature and a time sufficient to convert the pre-ceramic polymer resin to a ceramic thereby forming a reinforced ceramic composite.

27 Claims, 2 Drawing Sheets

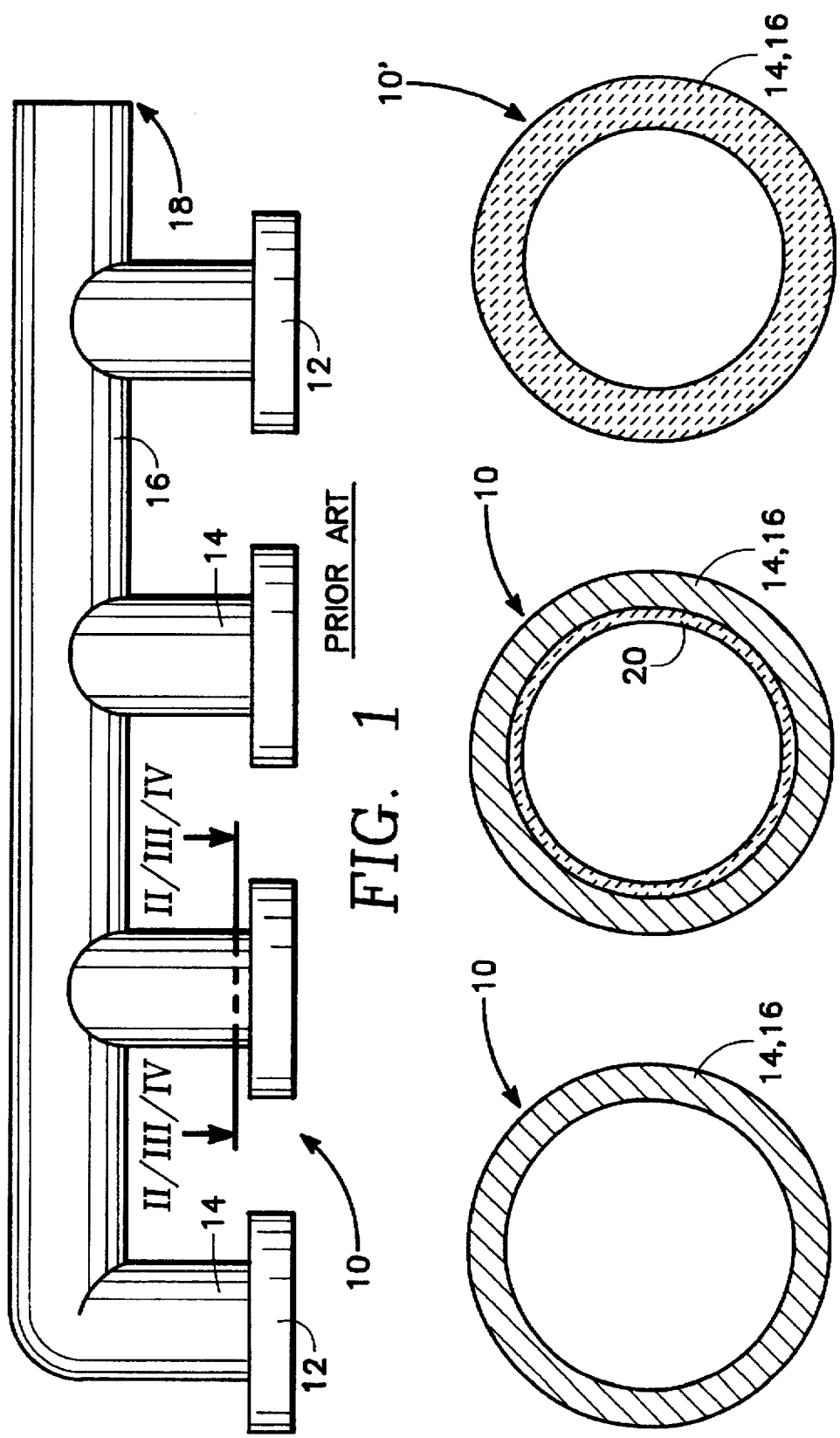

FIBER REINFORCED CERAMIC MATRIX COMPOSITE INTERNAL COMBUSTION ENGINE EXHAUST MANIFOLD

BACKGROUND OF THE INVENTION

1. Technical Field

This invention relates to parts of an internal combustion engine or the like and, more particularly, to apparatus for ducting the exhaust emissions of an internal combustion engine comprising; a plurality of header pipes connected to and receiving exhaust gases from the plurality of the exhaust ports of the engine; and an outlet therefrom connected to an exhaust pipe. More specifically, the invention relates to a breakage resistant, high temperature resistant, corrosion resistant, low heat rejection, structural fiber reinforced ceramic matrix composite exhaust manifold for internal combustion engine applications.

2. Background Art

For many years, the exhaust systems of internal combustion engines have remained substantially unchanged. There is a metal exhaust manifold, typically cast iron or steel, or tubular steel, that collects the exhaust gases emitted from the exhaust ports of the engine and outputs them into a single exhaust pipe. Typically, a muffler, and/or a catalytic converter device is disposed in-line with the exhaust pipe to reduce noise and pollutants associated with engine operation. A typical prior art exhaust manifold design is depicted in simplified form in FIG. 1 where it is generally indicated as 10. There are a plurality of flanges 12 which are bolted or clamped over the exhaust ports (not shown) of the engine (also not shown). The flanges connect individual header pipes 14 to a common outlet pipe 16 which leads and is connected to the exhaust system (not shown) at 18. Since good (minimal restriction) exhaust gas flow is important in overall engine performance, the curves of the pipes, the interior smoothness, and the like, are factors considered by designers thereof. Such factors are somewhat relevant to the novelty of the present invention but will not be addressed herein in favor of simplified drawings which clearly point out the true novelty in a manner easily understood by those of ordinary skill in the art.

Most early and present prior art exhaust manifolds were totally of metal as indicated in FIG. 2. Commercial manifolds were/are generally of cast iron or cast steel while specialty manifolds for high performance engines and the like were/are of welded steel or stainless steel pipe so as to provide a "tuned" exhaust as known to those skilled in the art. Engine designers continue to have difficulties with current exhaust manifolds of metal design in two distinct arenas. First, during heavy load engine operation exhaust gases can be in excess of 1400° F. while the engine block that it is mechanically connected to is held to a maximum of 300° F. by the water cooling system. If a cast iron exhaust manifold is allowed to get too hot, the manifold can warp or even crack due to the large loads introduced into it from the large differences in thermal expansion between the two mechanically connected parts. This is due to its higher temperature. The manifold wants to thermally grow to a much larger size than the mechanical connection to the block will allow. This failure allows raw exhaust gases into the engine compartment. This occurrence typically requires replacement of, or removal and repair of, the manifold. Although this is not a well known problem, those skilled in the art of engine design will agree that it is a continuing dilemma. Current technology approaches to alleviating the problem are to utilize a much higher cost stainless steel, which has a substantially lower coefficient of thermal expansion than cast iron, or to reduce the overall temperature of the exhaust manifold by increasing the heat rejected back to the block at the mounting flanges, or to segment the exhaust manifold into sections that slide inside one another so as to provide the manifold with the ability to grow. The segmented exhaust manifolds, however, tend to leak at the joints over time. The second major arena of difficulty for engine designers comes primarily in the marine industry. Here, regulatory requirements dictate maximum allowable engine compartment temperatures and engine "touch" temperatures for in-board marine applications. This typically requires the use of water cooled exhaust manifolds to achieve the regulatory constraints. The main problem associated with this approach is corrosion of the metal manifold. As a result, water-cooled cast iron manifolds must be replaced much more often than desirable; or, the manifolds must be manufactured of a much more costly stainless steel material.

More recently, for use with engines having higher operating temperatures, the addition of a ceramic liner 20, as shown in FIG. 3, has been suggested. For this, the prior art suggests only the use of a monolithic ceramic material. See, for example, the 1995 patent of Ford Motor Company to Hartsock (U.S. Pat. No. 5,404,721).

In another co-pending application entitled METHODS AND APPARATUS FOR MAKING CERAMIC MATRIX COMPOSITE LINED AUTOMOTIVE PARTS AND FIBER REINFORCED CERAMIC MATRIX COMPOSITE AUTOMOTIVE PARTS by the inventors herein U.S. Ser. No. 08/515,849, filed on Aug. 16, 1995 and assigned to the common assignee of this application, an improved structural fiber reinforced ceramic matrix composite (FRCMC) material is disclosed for lining metal parts such as exhaust manifolds which does not suffer from the problems of failure due to thermal shock, damage from minor impacts, or erosion of a monolithic ceramic liner the following is a summary of the above co-pending patent application, the teachings of which are incorporated herein by reference.

SUMMARY OF METHODS AND APPARATUS FOR MAKING CERAMIC MATRIX COMPOSITE LINED AUTOMOTIVE PARTS AND FIBER REINFORCED CERAMIC MATRIX COMPOSITE AUTOMOTIVE PARTS

A first aspect of the present invention is a method for forming a metal part having a breakage resistant ceramic liner comprising the steps of, forming a metal part having a mating surface for receiving the liner; forming a liner of a ceramic material containing pores; filling the pores with a pre-ceramic polymer resin; firing the pre-ceramic polymer resin saturated liner at a temperature and for a time (designated by the resin manufacturer) which converts the resin into a ceramic within the pores; and, bonding the ceramic liner to the mating surface of the metal part.

In one embodiment, the step of forming the liner of a ceramic material containing pores comprises pouring an inexpensive castable cementatious slurry into a liner-shaped mold, firing the molded slurry material for a time and at a temperate which converts it into a handleable pre-ceramic form, removing the pre-ceramic form from the mold, and firing the pre-ceramic form for a time and at a temperate which converts it into a ceramic form containing pores formed by out-gassing. And, the step of filling the pores with a polymer-derived ceramic resin comprises placing the liner into a bath containing a liquid pre-ceramic polymer resin until the pores are saturated with the resin. Preferably, the resin is silicon-carboxyl resin (sold by Allied-Signal under the trade name Blackglas).

In a second embodiment, the step of forming the liner of a ceramic material containing pores comprises positioning a fiber preform into a liner-shaped mold to occupy 30% to 60% of the volume of the mold, forcing a liquid pre-ceramic polymer resin through the preform to fill the remaining volume of the mold with the liquid pre-ceramic polymer resin, firing the mold for a time and at a temperate which converts it into a handleable pre-ceramic form, removing the pre-ceramic form from the mold, and firing the pre-ceramic form for a time and at a temperate which converts the liquid pre-ceramic polymer resin into a ceramic matrix composite form containing pores formed by outgassing. Preferably, the liquid pre-ceramic polymer resin is silicon-carboxyl resin, e.g. Blackglas.

A second aspect of the present invention is a method for forming a metal part having a breakage resistant ceramic liner comprising the steps of, forming a liner of a ceramic material containing pores; filling the pores with a pre-ceramic polymer resin; firing the pre-ceramic polymer resin saturated liner at a temperature and for a time (as designated by the resin manufacturer), which converts the resin into a ceramic within the pores; positioning the liner within a mold for the metal part with the mating surface of the liner facing into a portion of the mold to be occupied by the metal forming the part; and, filling the mold with molten metal to form the part.

As with the first aspect, the step of forming the liner of a ceramic material containing pores can comprise either approach described above. And, the step of filling the pores with a polymer-derived ceramic resin again comprises placing the liner into a bath containing a liquid pre-ceramic polymer resin until the pores are saturated with the resin; firing the pre-ceramic polymer resin saturated liner at a temperature and for a time which converts the resin into a ceramic within the pores.

In all cases where the pores formed by outgassing are filled, it is preferred to repeat the pore-filling and re-heating process several times to virtually totally remove the pores from the final product.

In another aspect of the present invention, a method of making a fiber reinforced ceramic matrix composite automotive part is disclosed comprising the steps of, forming a preform in the shape of the part from fibers of a generic fiber system employable in fiber reinforced ceramic matrix composites; placing the preform in a cavity of a mold having the shape of the part; forcing a liquid polymer-derived ceramic resin through the cavity to fill the cavity and saturate the preform; heating the mold at a temperature and for a time associated with the polymer-derived ceramic resin which transforms the liquid polymer-derived ceramic resin-saturated preform into a polymer composite part; removing the polymer composite part from the mold; and, firing the polymer composite part in an inert atmosphere at a temperature and for a time associated with the polymer-derived ceramic resin which transforms the polymer-derived ceramic resin into a ceramic whereby the polymer composite part is transformed into a fiber reinforced ceramic matrix composite part.

Preferably, the method also includes the steps of, immersing the fiber reinforced ceramic matrix composite part containing pores formed by outgassing during firing into a bath of the liquid polymer-derived ceramic resin to fill the pores with the liquid polymer-derived ceramic resin; firing the fiber reinforced ceramic matrix composite part in an inert atmosphere at a temperature and for a time associated with the polymer-derived ceramic resin which transforms the polymer-derived ceramic resin in the pores into a ceramic; and, repeating this process until the pore density within the final fiber reinforced ceramic matrix composite part is less than a pre-established percentage affording maximum strength to the part.

The preferred method is also adaptable to forming hollow parts such as engine manifolds by employing the steps of, forming a first preform in the shape of a lower portion of the manifold from fibers of a generic fiber system employable in fiber reinforced ceramic matrix composites; placing the first preform in a cavity of a first mold having the shape of the lower portion of the manifold; forcing a liquid polymer-derived ceramic resin through the cavity to fill the cavity and saturate the first preform; heating the first mold at a temperature and for a time associated with the polymer-derived ceramic resin which transforms the liquid polymer-derived ceramic resin-saturated first preform into a first polymer composite part; removing the first polymer composite part from the mold; forming a second preform in the shape of an upper portion of the manifold from fibers of the generic fiber system; placing the second preform in a cavity of a second mold having the shape of the upper portion of the manifold; forcing the liquid polymer-derived ceramic resin through the cavity to fill the cavity and saturate the second preform; heating the second mold at a temperature and for a time associated with the polymer-derived ceramic resin which transforms the liquid polymer-derived ceramic resin-saturated second preform into a second polymer composite part; removing the second polymer composite part from the mold; fitting the first polymer composite part and the second polymer composite part together along mating edges to form the manifold as a hollow conduit-shaped part; and, firing the polymer composite manifold in an inert atmosphere at a temperature and for a time associated with the polymer-derived ceramic resin which transforms the polymer-derived ceramic resin into a ceramic whereby the polymer composite manifold is transformed into a fiber reinforced ceramic matrix composite manifold and the upper portion and the lower portion are fused together along the mating edges. Pores formed by outgassing are preferably sealed in the manner described above to give maximum strength to the resultant manifold and seal any leakage that may exist along the mating edges.

Where the manifold is an exhaust manifold to be internally filled with a ceramic foam catalyst substrate structure the process and required tooling can be greatly simplified by prior to the step of placing the second preform in a cavity of a second mold having the shape of the upper portion of the manifold additionally including the steps of, placing the first preform as part of a cavity-defining wall of the second mold; and, placing the ceramic foam catalyst substrate structure in the first preform whereby the first preform and the ceramic foam catalyst substrate structure in combination form part of the cavity of the second wall. In the interest of engine weight, and the like, an exhaust manifold entirely of a ceramic material would be highly desirable.

Wherefore, it is the object of the present invention to provide such an exhaust manifold made entirely of a structural fiber reinforced ceramic matrix composite (FRCMC) material.

Other objects and benefits of this invention will become apparent from the description which follows hereinafter when read in conjunction with the drawing figures which accompany it.

SUMMARY OF THE DISCLOSURE

The foregoing objects have been achieved in an exhaust manifold for an internal combustion engine having a plurality of header pipes to be connected to and receiving exhaust gases from respective ones of a plurality of exhaust ports of the engine and a single outlet to be connected to an exhaust pipe or system wherein the exhaust manifold is of a structural fiber reinforced ceramic matrix composite material comprising fibers of a generic fiber system that have been coated with a generic interface material disposed throughout a ceramic matrix.

The preferred resin to create the ceramic matrix is either of the two polymer-derived ceramic resins (hereinafter used interchangeably with the term pre-ceramic polymer resin) comprising silicon-carboxyl and alumina silicate or a cementatious resin that has been modified to emulate the processing methods of typical structural polymer composite systems such as monoaluminum phosphate (also know as monoalumino phosphate) resin. The preferred generic fiber system comprises alumina, Altex, Nextel 312, Nextel 440, Nextel 510, Nextel 550, silicon nitride, silicon carbide, HPZ, graphite, carbon and peat. The preferred generic interface material comprises carbon, silicon nitride, silicon carboxyl, silicon carbide or boron nitride or a layered combination of one or more of the above interfacial materials.

BRIEF DESCRIPTION OF THE DRAWINGS

FIG. 1 is a simplified plan view of a typical exhaust manifold structure.

FIG. 2 is a cross section through the exhaust manifold of FIG. 1 in the plane II/III/IV—II/III/IV when the manifold is a prior art metal manifold.

FIG. 3 is a cross section through the exhaust manifold of FIG. 1 in the plane II/III/IV—II/III/IV when the manifold is a prior art metal manifold having a monolithic ceramic liner on the inner walls thereof.

FIG. 4 is a cross section through the exhaust manifold of FIG. 1 in the plane II/III/IV—II/III/IV when the manifold is an all FRCMC manifold according to the present invention.

DETAILED DESCRIPTION OF THE PREFERRED EMBODIMENT

Figure 5:
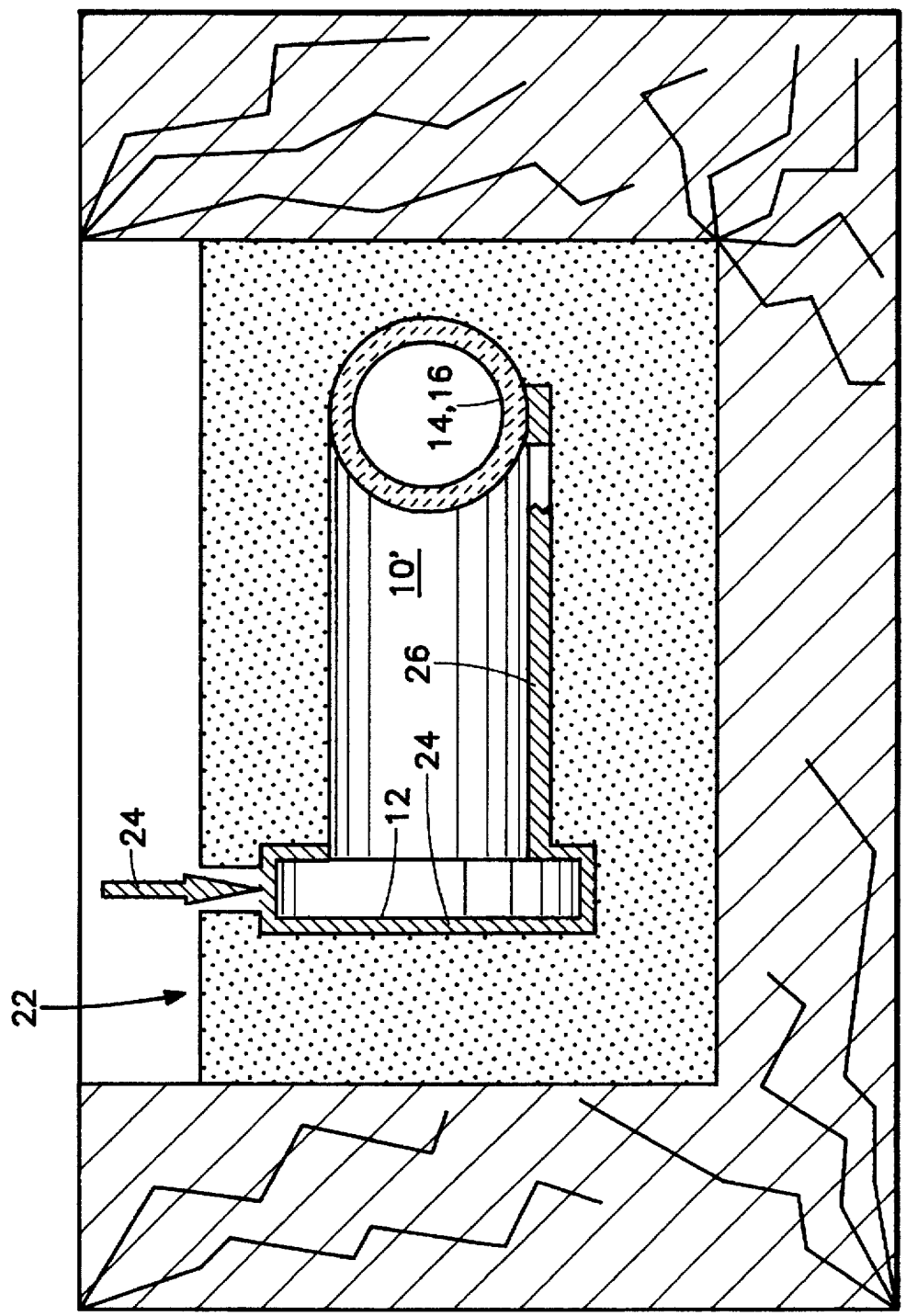
FIG. 5 is a partially cutaway drawing of a mold showing how the all FRCMC manifold of the present invention can have additional structural metal members attached thereto by molding them in place.

According to the present invention and as also employed in the engine mentioned above, the exhaust manifold 10' of FIG. 4 is made entirely from a FRCMC structure that eliminates the strain intolerance and notch sensitivity of conventional prior art monolithic ceramic structures. The FRCMC of this invention employs any of several polymer-derived ceramic resins commercially available such as silicon-carboxyl resin (sold by Allied-Signal under the trade name Blackglas), alumina-silicate resin (sold by Applied Poleramics under the trade name CO2) or cementatous systems that have been modified to emulate the processing methods of typical structural polymer composite systems such as monoaluminum phosphate (aka monoalumino phosphate) resin combined with a generic fiber system (hereinafter used interchangeably with the term reinforcing fibers such as, but not limited to, alumina, Altex, Nextel 312, Nextel 440, Nextel 510, Nextel 550, Silicon Nitride, Silicon Carbide, HPZ, Graphite, Carbon, and Peat. To accomplish the objectives of the present invention, the fiber system is first coated to 0.1 to 5.0 microns thickness with an interface material such as, but not limited to, carbon, silicon nitride, silicon carboxyl, silicon carbide, or boron nitride. The interface material prevents the resin from adhering directly to the fibers of the fiber system. Thus, when the resin has been converted to a ceramic, there is a weak disbond layer between the ceramic and fibers imparting the desired more ductile qualities to the final FRCMC.

Thus, according to the present invention, the steps of constructing a breakage resistant, heat resistant, corrosion resistant, low heat rejection, ceramic exhaust manifold comprise applying the interface material on the fiber system as per best industry standards, mixing the interface-coated fiber system with the resin, forming the manifold as per best industry practices used in the fabrication of structural polymer composite hardware, and firing the resultant part at a high temperature per material supplier specifications to convert the resin into a ceramic.

There are a number of distinct advantages offered by a FRCMC internal combustion engine exhaust manifold over current metal and potential monolithic ceramic manifolds, they are as follows:

1) Being that the manifold is a ceramic, it inherently has a better insulating capability than it's metallic counterpart, thus reducing engine compartment heat load.

2) Being that the manifold is a ceramic, it has a substantially lower coefficient of thermal expansion than it's metallic counterpart, thus reducing the thermally induced loads on the manifold from the extreme temperature differential between the engine block and the manifold.

3) Being that the manifold is a ceramic, it is inherently corrosion resistant.

4) Being that the manifold is a ceramic, it inherently is more temperature resistant than it's metallic counterpart.

5) Being that the manifold is a ceramic, it inherently is substantially lighter than it's metallic counterpart (FRCMC is lower density than aluminum, i.e. approximately 0.08 pounds/cubic inch).

6) Being that the manifold is a fiber reinforced composite with a fiber interface coating, it is substantially more strain tolerant (ductile) than it's monolithic ceramic counterpart.

7) Being that the manifold is a fiber reinforced composite with a fiber interface coating, it is substantially less notch sensitive than it's monolithic ceramic counterpart.

8) Being that the manifold is a fiber reinforced composite with a fiber interface coating, it is substantially more breakage resistant than it's monolithic ceramic counterpart.

9) Being that the manifold is a fiber reinforced composite with a fiber interface coating, it's strength characteristics can be tailored via choice of fiber, interface coating, and fiber orientation.

10) Being that the manifold is a fiber reinforced composite with a fiber interface coating, it's coefficient of thermal expansion can be tailored to better match that of the engine block via selection of fiber system.

11) Being that the manifold is a fiber reinforced ceramic matrix composite with a fiber interface coating, it's material properties do not degrade as a function of temperature in the manifold operating temperature range as does it's metallic counterpart.

12) Being that the manifold is a fiber reinforced ceramic matrix composite with a fiber interface coating, it is more resistant to damage resulting from thermal shock than it's monolithic ceramic counterpart.

EXAMPLE

Fabrication of a FRCMC Exhaust Manifold

1. Lay-up either a pair of half-manifolds (upper and lower halves) to be joined at a later step or a total manifold, from woven cloth matting of one the fibers that are identified in co-pending application U.S. Ser. No. 08/515,604, filed on Aug. 16, 1995 entitled HIGH EFFICIENCY, LOW-POLLUTION ENGINE by the common inventors of this application and assigned to the same assignee, the teachings of which are incorporated herein by reference.

2. The half-manifolds or total manifold fiber perform then have a fiber interface coating applied as per industry best practices. The fiber could have been coated prior to forming the fiber manifold shapes. The assignee of this application, Northrop Corporation, currently has a number of patents on the application of interface coatings, including, U.S. Pat. No. 5,034,181, entitled APPARATUS FOR METHOD OF MANUFACTURING PREFORMS; U.S. Pat. No. 5,110,771, entitled METHOD OF FORMING A PRECRACKED FIBER COATING FOR TOUGHENING CERAMIC FIBER-MATRIX COMPOSITES; U.S. Pat. No. 5,275,984, entitled FIBER COATING OF UNBONDED MULTI-LAYERS FOR TOUGHENING CERAMIC FIBER-MATRIX COMPOSITES; U.S. Pat. No. 5,162,271, entitled METHOD OF FORMING A DUCTILE FIBER COATING FOR TOUGHENING NON-OXIDE CERAMIC MATRIX COMPOSITES; and U.S. Pat. No. 5,221,578, entitled WEAK FRANGIBLE FIBER COATING WITH UNFILLED PORES FOR TOUGHENING CERAMIC FIBER-MATRIX COMPOSITES the teachings of which are incorporated herein by reference. Also, Allied-Signal or Sinterials are commercial companies which will apply an interface coating as a purchased service.

3. The half-manifolds or total manifold are then saturated with the resin, in this example being Blackglas resin. This step may also include squeezing the mixture of polymer-derived ceramic resin and interface material-coated fibers of a generic fiber system under pressure into a mold to form the manifold shaped structure.

4. The resin-saturated half-manifolds or total manifold is then heated as per the following cycle:

A) Ramp from ambient to 150° F. at 2.7°/minute

B) Hold at 150° F. for 30 minutes

C) Ramp at 1.7°/minute to 300° F.

D) Hold at 300° F. for 60 minutes

E) Cool at 1.2°/minute until temperature is below 140° F.

It should be noted that there are a variety of heat-up cycle definitions which will create usable hardware and the foregoing is by way of one example only and not intended to be exclusive.

5. If half-manifolds were made, they are snapped or fitted together along mating edges at this point to form a total manifold. The two pieces now fitted together are dipped in Blackglas resin for a minimum of five minutes. The part is then removed from the resin and heated as per the previous ramp-up rate to hold the edges together.

6. The polymer composite manifold is then pyrolized. In this regard, fabrication of a sealable container, such as a stainless steel box, capable of withstanding 1900° F. is required for the pyrolysis cycle in a standard furnace. In the alternative, an inert gas furnace could be used if available. The box should have two tubing connections, one on the bottom and one on the top to allow the box to be flooded with an inert gas. In this example, the manifold is placed in the box, the box placed in a standard furnace, stainless steel tubing is connected to the lower connector on the box and to a supply of high purity argon. Any equivalent inert gas could, of course, be used. The argon is allowed to flow into the box, and out the top vent at a rate of 5–10 standard cubic feet per hour for the entire heat cycle, thus assuring the manifold is totally enveloped in an inert environment. The furnace is closed and fired on the following basis:

A) Ramp to 300° F. at 223°/hour

B) Ramp to 900° F. at 43°/hour

C) Ramp to 1400° F. at 20°/hour

D) Ramp to 1600° F. at 50°/hour

E) Hold at 1600° F. for 4 hours

F) Ramp to 77° F. at −125°/hour

Again, there are a variety of heating schedules other than this one, given by way of example only, which will yield usable product.

7. Upon cooling, the manifold is removed from the furnace and box and submerged in a bath of Blackglas resin for enough time to allow all air to be removed from the manifold (typically 5 minutes or more). A vacuum infiltration step may also be used for this step. This fills any pores caused by outgassing or shrinkage of the matrix in the FRCMC manifold with the resin.

8. Steps 6 and 7 are then repeated until the level of porosity is below a desired level which imparts the maximum strength to the final FRCMC manifold. Typically, it is preferred that this cycle be repeated five times. The manifold is then ready for use.

FIG. 5 depicts an alternate aspect of the present invention which can be employed, if desired, to augment the strength of the resultant manifold. Being a ceramic material, the manifold 10' can be subjected to molten metal without damage. Thus, one can make a basic manifold 10' as described above which does not have completed flanges 12, for example. As depicted in FIG. 5, the basic manifold 10' is then positioned within a mold 22. Molten metal 24 is then poured into the mold 22. The metal 24 flows around the encased portions of the FRCMC manifold 10' capturing them within the metal as it hardens thus forming the flanges 12 and/or, if desired, a strong-back system 26 which can be bolted to the automobile to support the manifold 10' against excessive bending forces from the exhaust system and the like.

Wherefore, having thus described the present invention, what is claimed is:

1. A method of making a high temperature resistant fiber reinforced ceramic matrix composite exhaust manifold for an engine comprising the steps of:

a) forming a liner of a cast monolithic ceramic material containing pores;

b) filling the pores of the cast monolithic ceramic material with a pre-ceramic polymer resin;

c) coating reinforcing fibers with an interface material to prevent a pre-ceramic polymer resin from adhering strongly to the reinforcing fibers;

d) forming a mixture of a pre-ceramic polymer resin and reinforcing fibers coated with the interface material;

e) forming an exhaust manifold shaped structure from the mixture of the pre-ceramic polymer resin and the reinforcing fibers coated with the interface material by placing the mixture on at least a portion of the cast monolithic ceramic material; and, f) firing the exhaust component shaped structure at a temperature and a time sufficient to convert the pre-ceramic polymer resin to a ceramic thereby forming a reinforced ceramic composite.

2. The method of claim 1 wherein said step of coating reinforcing fibers with an interface material comprises:

coating the reinforcing fibers with 0.1 to 5.0 microns thickness of at least one layer of the interface material of at least one of carbon, silicon nitride, silicon carbide, silicon carboxide, or boron nitride.

3. The method of claim 1 wherein said step of coating reinforcing fibers with an interface material comprises:

coating reinforcing fibers of at least one of alumina, high purity alumina, alumina boro silicate, mullite, alumina silicate, silicon nitride, silicon carbide, carbon, or peat with the interface material.

4. The method of claim 1 wherein said step of forming a mixture of the pre-ceramic polymer resin and the reinforcing fibers coated with the interface material comprises:

mixing the reinforcing fibers coated with the interface material with a material chosen from the group consisting of pre-ceramic polymer resins commercially available such as silicon-carboxyl resin, alumina-silicate resin or monoaluminum phosphate resin.

5. The method of claim 1 wherein said step of forming an exhaust manifold shaped structure from the mixture of the pre-ceramic polymer resin and reinforcing fibers coated with the interface material comprises:

squeezing the mixture of the pre-ceramic polymer resin and the reinforcing fibers coated with the interface material under pressure into a mold to form the manifold shaped structure prior to firing.

6. The method of claim 1 and, after said step (f) thereof of firing additionally comprising the steps of:

a) positioning the ceramic manifold in a mold; and, b) pouring molten metal into the mold around portions of the ceramic manifold to add additional structural components of metal to the ceramic manifold.

7. The method of claim 1 wherein said step of coating reinforcing fibers with an interface material comprises:

coating reinforcing fibers with the interface material, wherein said reinforcing fibers comprises ceramic fibers capable of withstanding high processing temperatures associated with converting the pre-ceramic polymer resin to a ceramic matrix in an inert environment.

8. The method of claim 4 wherein said step of forming a mixture of pre-ceramic polymer resin and the reinforcing fibers coated with the interface material comprises:

mixing the reinforcing fibers coated with the interface material with a modified cementatous pre-ceramic polymer resin.

9. The method of claim 1 wherein the step of forming an exhaust manifold comprises:

forming an exhaust manifold shaped structure from the mixture of the pre-ceramic polymer resin and the reinforcing fibers coated with the interface material by placing the mixture on an inside portion of the cast monolithic ceramic material.

10. The method of claim 1 wherein the step of forming an exhaust manifold comprises:

forming an exhaust manifold shaped structure from the mixture of the pre-ceramic polymer resin and the reinforcing fibers coated with the interface material by placing the mixture on an outside portion of the cast monolithic ceramic material.

11. The method of claim 1 wherein the step of forming an exhaust manifold comprises:

forming an exhaust manifold shaped structure from the mixture of the pre-ceramic polymer resin and the reinforcing fibers coated with the interface material by placing the mixture around the cast monolithic ceramic material.

12. A method of making a high temperature resistant fiber reinforced ceramic matrix composite exhaust manifold for an engine comprising the steps of:

a) forming a liner of a cast monolithic ceramic material containing pores;

b) filling the pores of the cast monolithic ceramic material with a pre-ceramic polymer resin;

c) coating reinforcing fibers with an interface material to prevent a pre-ceramic polymer resin from adhering directly to the reinforcing fibers, the reinforcing fibers comprising fibers of at least one of alumina, high purity alumina, alumina boro silicate, mullite, alumina silicate, silicon nitride, silicon carbide, HPZ, graphite, carbon, or peat, the interface material comprising a few microns thickness of at least one of carbon, silicon nitride, silicon carbide, silicon carboxide, or boron nitride;

d) forming a mixture of a pre-ceramic polymer resin chosen from the group consisting of silicon-carboxyl resin, monoaluminum phosphate resin, or alumina silicate resin and the reinforcing fibers coated with the interface material;

e) forming an exhaust manifold shaped structure from the mixture of the pre-ceramic polymer resin and the reinforcing fibers coated with the interface material by placing the mixture on at least a portion of the cast monolithic ceramic material; and, f) firing the exhaust manifold shaped structure at a temperature and for a time sufficient to convert the pre-ceramic polymer resin to a ceramic thereby forming a reinforced ceramic composite.

13. The method of claim 12 wherein said step of forming a mixture of a pre-ceramic polymer resin and reinforcing fibers coated with the interface material comprises:

saturating a woven cloth matting of the reinforcing fibers coated with the interface material and the pre-ceramic polymer resin.

14. The method of claim 13 wherein said step of forming an exhaust manifold shaped structure from the mixture of the pre-ceramic polymer resin and the reinforcing fibers coated with the interface material additionally includes the step of:

squeezing the woven cloth matting of the reinforcing fibers coated with the interface material and saturated with the pre-ceramic polymer resin in a mold under pressure prior to firing.

15. The method of claim 12 and, after said step (f) of firing additionally comprising the steps of:

(1) positioning the manifold in a mold; and, (2) pouring molten metal into the mold around portions of the manifold to add additional structural metal components to the manifold.

16. The method of claim 12 wherein the step of forming an exhaust manifold comprises:

forming an exhaust manifold shaped structure from the mixture of the pre-ceramic polymer resin and the reinforcing fibers coated with the interface material by placing the mixture on an inside portion of the cast monolithic ceramic material.

17. The method of claim 12 wherein the step of forming an exhaust manifold comprises:

forming an exhaust manifold shaped structure from the mixture of the pre-ceramic polymer resin and the reinforcing fibers coated with the interface material by placing the mixture on an outside portion of the cast monolithic ceramic material.

18. The method of claim 12 wherein the step of forming an exhaust manifold comprises:

forming an exhaust manifold shaped structure from the mixture of the pre-ceramic polymer resin and the reinforcing fibers coated with the interface material by placing the mixture around the cast monolithic ceramic material.

19. A method of making a high temperature resistant fiber reinforced ceramic matrix composite exhaust manifold for an engine comprising the steps of:

a) forming a liner of a cast monolithic ceramic material containing pores;

b) filling the pores of the cast monolithic ceramic material with a pre-ceramic polymer resin;

c) coating reinforcing fibers with an interface material to prevent a pre-ceramic polymer resin from adhering directly to the reinforcing fibers, the reinforcing fibers comprising fibers of at least one of alumina, high purity alumina, alumina boro silicate, mullite, alumina, silicate, silicon nitride, silicon carbide, HPZ, graphite, carbon, or peat, the interface material comprising 0.1 to 5.0 microns thickness of at least one of carbon, silicon nitride, silicon carbide, silicon carboxide, or boron nitride;

d) forming a mixture of silicon-carboxyl resin and the reinforcing fibers coated with the interface material;

e) forming an exhaust manifold shaped structure from the mixture of the silicon-carboxyl resin and the reinforcing fibers coated with the innerface material by placing the mixture on at least a portion of the cast monolithic ceramic material; and, f) firing the exhaust manifold shaped structure at a temperature and for a time sufficient to convert the silicon-carboxyl to a ceramic.

20. The method of claim 19 wherein said step of forming a mixture of silicon-carboxyl resin and reinforcing fibers coated with the interface material comprises:

saturating a woven cloth matting of the reinforcing fibers coated with the interface material with the silicon-carboxyl resin.

21. The method of claim 20 wherein said step of forming an exhaust manifold shaped structure from the mixture of the silicon-carboxyl resin and reinforcing fibers coated with the interface material additionally includes the step of:

squeezing the woven cloth matting of the reinforcing fibers coated with the interface material and saturated with the silicon-carboxyl resin in a mold under pressure prior to firing.

22. The method of claim 19 and, after said step (f) of firing additionally comprising the steps of:

(1) immersing the fired manifold into a bath of silicon-carboxyl resin to fill pores formed by outgassing therein with the silicon-carboxyl resin;

(2) refiring the manifold at a temperature and for a time sufficient to convert the silicon-carboxyl to a ceramic; and, (3) repeating steps (1) and (2) until the remaining volume of pores formed by outgassing is below an amount which maximizes the strength of the manifold.

23. The method of claim 19 and, after said step (f) of firing additionally comprising the steps of:

(1) positioning the manifold in a mold; and, (2) pouring molten metal into the mold around portions of the manifold to add additional structural metal components to the manifold.

24. The method of claim 23 and, after said step (e) additionally comprising the steps of:

(1) positioning the manifold in a mold; and, (2) pouring molten metal into the mold around portions of the manifold to add additional structural metal components to the manifold.

25. The method of claim 19 wherein the step of forming an exhaust manifold comprises:

forming an exhaust manifold shaped structure from the mixture of the pre-ceramic polymer resin and the reinforcing fibers coated with the interface material by placing the mixture on an inside portion of the cast monolithic ceramic material.

26. The method of claim 19 wherein the step of forming an exhaust manifold comprises:

forming an exhaust manifold shaped structure from the mixture of the pre-ceramic polymer resin and the reinforcing fibers coated with the interface material by placing the mixture on an outside portion of the cast monolithic ceramic material.

27. The method of claim 19 wherein the step of forming an exhaust manifold comprises:

forming an exhaust manifold shaped structure from the mixture of the pre-ceramic polymer resin and the reinforcing fibers coated with the interface material by placing the mixture around the cast monolithic ceramic material.

* * * * *